US012750357B2

(12) United States Patent
Seuren et al.

(10) Patent No.: US 12,750,357 B2
(45) Date of Patent: Sep. 29, 2026

(54) COMPLIANCE-BASED CLIENT ACCESS CONTROL FOR NETWORK SERVICES

(71) Applicant: Fortanix, Inc., Santa Clara, CA (US)

(72) Inventors: Joep Seuren, Neerkant (NL); Allard Henri Ankoné, Doetinchem (NL); Gijsbrecht Natanaël Kwakkel, Lienden (NL)

(73) Assignee: Fortanix, Inc., Santa Clara, CA (US)

( * ) Notice: Subject to any disclaimer, the term of this patent is extended or adjusted under 35 U.S.C. 154(b) by 25 days.

(21) Appl. No.: 18/883,349

(22) Filed: Sep. 12, 2024

(65) Prior Publication Data

US 2026/0075049 A1 Mar. 12, 2026

(51) Int. Cl.
*H04L 9/40* (2022.01)

(52) U.S. Cl.
CPC ................................ *H04L 63/0823* (2013.01)

(58) Field of Classification Search
CPC .......................... H04L 63/0823; H04L 63/102
See application file for complete search history.

(56) References Cited

U.S. PATENT DOCUMENTS

2017/0288883 A1* 10/2017 Goverdhan ......... H04L 63/0823
2019/0044940 A1* 2/2019 Khalil ................... H04L 9/3247
2022/0101702 A1* 3/2022 Olsen ..................... G08B 13/06
2023/0393837 A1* 12/2023 Zhang ................... H04L 9/0891
2024/0413982 A1* 12/2024 Prabhakar ........... H04L 43/0876

* cited by examiner

*Primary Examiner* — Sangseok Park
(74) *Attorney, Agent, or Firm* — Lowenstein Sandler LLP

(57) ABSTRACT

One or more compliance requirements for accessing a service are provided to a client device by a processing device of an access control server. One or more compliance indicators associated with the compliance requirements are received from the client device. A request for an access certificate to access the service is received from the client device. The compliance indicators are evaluated based on the one or more compliance requirements. In response to determining that each compliance requirement is satisfied by a respective compliance indicator, the access certificate is generated. The access certificate comprises an indication that at least one of the client device, a user of the client device, or a user session on the client device complies with the compliance requirements. The access certificate further comprises a digital signature of the access control server that is verifiable by the service. The access certificate is provided to the client device.

20 Claims, 8 Drawing Sheets

COMPLIANCE-BASED CLIENT ACCESS CONTROL FOR NETWORK SERVICES

TECHNICAL FIELD

Aspects and embodiments of the present disclosure relate to network services, and in particular to compliance-based client access control for network services.

BACKGROUND

A network service is a network-connected application that provides various capabilities such as communication, data storage, computation, etc. Network services may operate across various networks, such as local area networks (LANs), wide area networks (WANs), the Internet, etc. A network service may be or include a hosted service, which may be provided by a server to one or more clients. A network service may also be or include peer-to-peer between servers and/or clients. Network services may be centralized (e.g., at a single server or at servers within a datacenter) or decentralized (e.g., provided by various peers, clients, or servers working together across different geographic regions).

BRIEF DESCRIPTION OF DRAWINGS

Various embodiments in accordance with the present disclosure will be described with reference to the drawings, in which.

DETAILED DESCRIPTION

Figure 1:
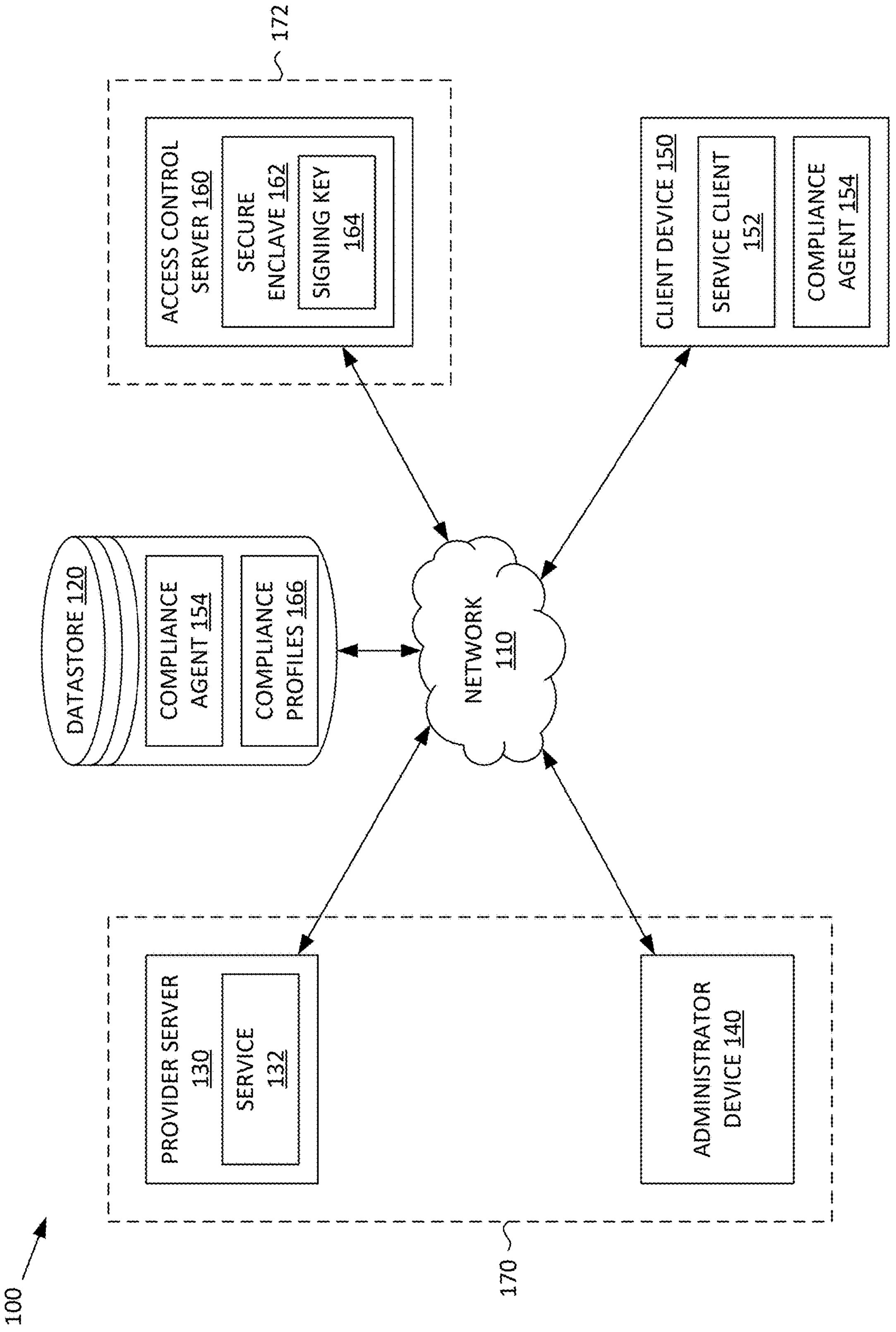
FIG. 1 is a block diagram of an example system architecture for providing compliance-based client access control for network services, in accordance with an embodiment.

Aspects of the present disclosure relate to compliance-based client access control for network services. A network service is a network-connected application that provides various capabilities such as communication, data storage, computation, and combinations of the above and other capabilities. Network services may operate across various networks, such as local area networks (LANs), wide area networks (WANs), the Internet, or similar networks. A network service may be or include a hosted service, which may be provided by a server to one or more clients. A network service may also be or include peer-to-peer between servers and/or clients. Aspects of the present disclosure described with respect to hosts and clients may also apply to peer-to-peer services and vice versa. Network services may be centralized (e.g., at a single server or at servers within a datacenter) or decentralized (e.g., provided by various peers, clients, or servers working together across different geographic regions). Examples of network services include websites and web applications, Secure Shell (SSH) and Remote Desktop Protocol (RDP) for remote login and command execution, and Virtual Private Network (VPN) endpoints for connecting to private networks over public networks.

In some network services, the service provider (e.g., a host server) may restrict the service clients that are permitted to connect to the service. For example, a service provider may reject connections from service clients that do not have a known identity or that do not possess a certain token needed to access the service (e.g., a cryptographic key). Reasons for restricting access to services may vary. Access restriction may provide security benefits by rejecting connections from unknown malicious actors while allowing access by credentialed employees. Access restriction may also provide economic benefits by allowing connections from paying customers while not allowing connections from non-customers. Other benefits, alone or in combination, may provide a rationale for restricting access to network services. Once a client has been granted access to a service, access may continue under various timing conditions. For example, a connection may automatically end after a set period of time regardless of activity, or a connection may end after a set time of inactivity. A host or client may end a connection based on other conditions (e.g., a user may close a session after their purpose has been accomplished).

Some network services such as those described above face several challenges related to controlling access from users. In some scenarios, a service may want to control access for service clients based on the underlying hardware and software that the service client is using. For example, an organization may want to ensure that employees' computers meet various compliance requirements before allowing access to the organization's VPN. In another example, an application may require clients to have sufficient resources available (e.g., RAM) before connecting. Some services may be unable to verify these requirements before allowing access, e.g., the host may have to connect to the client before the host can query the client about its capabilities and configurations. Clients may be able to advertise some of their capabilities before connecting to the service, but the client or their advertisement may not be trustworthy before a connection is established.

Another challenge faced by some systems is continued client compliance with access requirements after a connection with the service has been established. Client devices may change their capabilities or configurations (e.g., intentionally or unintentionally) during a service session and may fall out of compliance with the initial access requirements. Hosts may continue the connection unaware of the changes, which may have security implications or cause other problems. Hosts may want to change an access level of the service (e.g., increase or decrease access to various service capabilities) or end the service session when a client's compliance changes.

As a result of these and other challenges, services and service providers may experience increased vulnerability to non-compliant clients before and during service sessions, which may lead to security breaches (e.g., data theft or loss), economic losses, and other losses and liabilities. Providers may attempt to mitigate such risks by, e.g., reducing availability of services or isolating services from other infrastructure (e.g., by deploying additional servers), but these mitigations may be costly for service providers and clients. It may be difficult for services to establish trust with client devices despite these mitigations. Service users may be burdened by various mitigations, such as by having to connect to a service from a particular secure location, having to obtain and use a physical security key with a client device, or similar. These challenges and mitigations may lead to increased costs and burdens associated with providing and using network services.

Aspects of the present disclosure address the above and other challenges of the existing technology by providing compliance-based client access control for network services. In an embodiment, an access control server is provided. The access control server may be a trusted intermediary for network services that can verify client compliance with access requirements before and during service sessions. The access control server may be configured with compliance profiles corresponding to the access requirements of different services and different capabilities or access levels within services. The access control server may communicate with a client to determine whether the client complies with the access profile for a particular service. For example, the access control server may receive compliance indicators from a compliance agent running on the client. The access control server may further engage with the client in various protocols to establish the integrity of compliance information received from the client. The access control server may generate and sign a certificate indicating the client's compliance with the compliance profile. The client may subsequently use the certificate to access the service. The service host may verify the access control server's digital signature (e.g., using a trusted certificate authority) and may grant the client access to the service or capabilities within a service corresponding to the compliance indication in the access certificate.

In an embodiment, access certificates provided by an access control server may be limited-duration access certificates. For example, an access certificate may expire within a few minutes, hours, days, etc., depending on the security context or other context of a particular service. The client may thus be required to communicate with the access control server on a regular basis to ensure continued compliance with the compliance profile and to obtain new limited-duration access certificates. If the service host receives an access certificate indicating a change in compliance profile, the service host may determine to expand access to the service, reduce access to the service, end the service session, etc.

Accordingly, systems using the techniques described herein can provide compliance-based client access control for network services that enables client characteristics and configurations to be verified before establishing a connection to a service, and to be continually verified during a service session at appropriate intervals. Compliance-based access control may improve security and reduce vulnerabilities for service providers by ensuring that clients are compliant before connecting to and during communication with the service. Service providers can also have greater trust in client compliance by using a trusted intermediary with trusted protocols for verifying client compliance. Service providers can also provide fine-grained control of access to services and capabilities within services by using various compliance profiles and updating access when client compliance changes. Clients, in turn, may experience fewer burdens and increased convenience when connecting to various services. Thus, potential costs and liabilities for all parties may be reduced.

System Architecture

FIG. 1 is a block diagram of an example system architecture 100 for providing compliance-based client access control for network services, in accordance with an embodiment. System architecture 100 (also referred to as "system" herein) includes network 110, datastore 120, provider server 130, administrator device 140, client device 150, and access control server 160. In various embodiments, system 100 may include more or fewer components in different configurations than those depicted in FIG. 1. For example, system 100 may include additional client devices or provider servers in an embodiment.

Network 110 may include a public network (e.g., the Internet), a private network (e.g., a LAN, a WAN, a VPN, an enterprise network), a wired network (e.g., Ethernet), a wireless network (e.g., an 802.11 Wi-Fi network), a cellular network (e.g., a 5G network), routers, hubs, switches, server computers, or a combination thereof. For example, network 110 may include a plurality of the above types of networks connected together via a VPN, the Border Gateway Protocol (BGP), or other protocol. Network 110 or components thereof may be associated with different organizations in various embodiments. For example, components of network 110 may be associated with Internet Service Providers (ISPs), mobile or cellular carriers, cloud platform or software-as-a-service (SaaS) providers, private or public enterprises, private households or communities, etc. In an embodiment, network 110 (or a component thereof) may be a physical or virtual interconnect within a single device, such as a PCIe bus, a messaging system, or an API.

Figure 7:
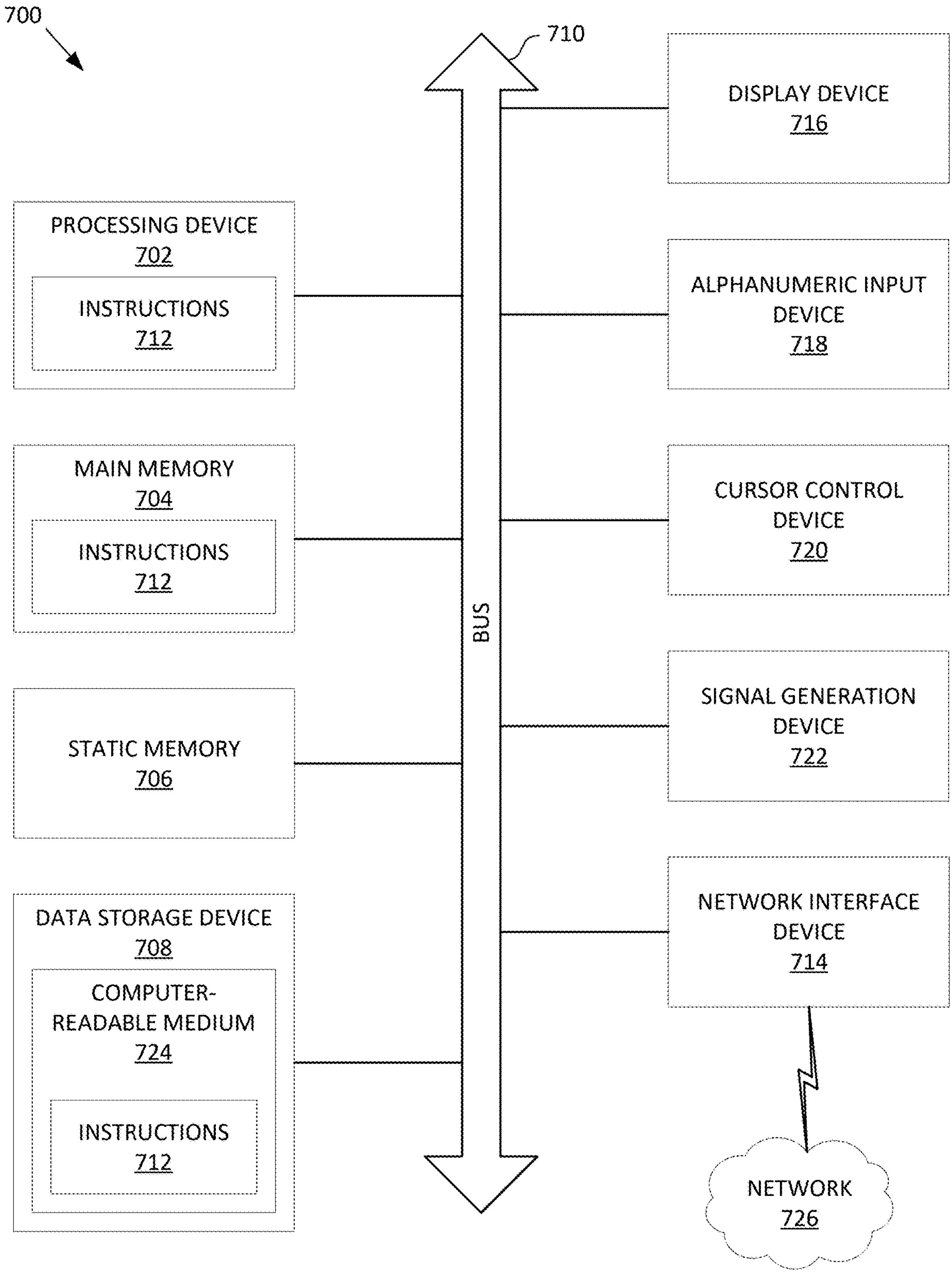
FIG. 7 illustrates an example computer system, in accordance with an embodiment.

Datastore 120 may include one or more persistent storage devices such as magnetic tapes or drives, solid-state drives, optical drives or similar (e.g., other storage technologies discussed with respect to FIG. 7). Datastore 120 may also include storage devices in a networked topology, such as a Storage Area Network (SAN), Network-Attached Storage (NAS), cloud-provisioned storage, or similar. Datastore 120 may be shared by other components (e.g., provider server 130 and access control server 160), or system 100 may include multiple datastores 120 each associated with one or more components. For example, servers 130 and 160 may each have a datastore connected over a network or connected locally via, e.g., a PCIe or SATA bus. In an embodiment, datastore 120 may be some other type of persistent storage such as an object-oriented database, a relational database, and so forth, that may be hosted by servers 130 and 160 or one or more different machines coupled to network 110.

Each of provider server 130, administrator device 140, client device 150, and access control server 160 may be a personal computer (PC), a laptop computer, a notebook computer, a mobile phone, a smartphone, a tablet computer, a digital assistant, a rackmount server, a router computer, or similar computing device. An example computing device is further described with respect to FIG. 7. Each of provider server 130, administrator device 140, client device 150, and access control server 160 may also be a virtualized resource such as a virtual machine (VM) or a containerized application. Each of provider server 130, administrator device 140, client device 150, and access control server 160 may also correspond to a collection of physical or virtual computing resources, such as a datacenter or a collection of servers or VMs distributed across multiple data centers. For example, servers 130 and 160 may correspond to cloud computing resources provisioned from a cloud computing provider. Each of provider server 130, administrator device 140, client device 150, and access control server 160 may run an operating system or one or more software applications.

Provider server 130 may provide one or more services over network 110, such as service 132. Examples of services that may be provided include websites, web applications, remote login (e.g., SSH), remote desktop (e.g., RDP), remote hardware and software management (e.g., baseboard management controller (BMC), router or switch management interface, cloud platform management console), private networking (e.g., VPN), database access and management, telecom and messaging, etc. Provider server 130 may correspond to a host in a host-client service or a peer in a peer-to-peer service. Provider server 130 may further correspond to a plurality of computing devices working together to provide a centralized or decentralized service. Provider server 130 may perform various activities in connection with providing service 132. For example, provider server 130 may perform computations, write to and read from volatile or non-volatile memory and storage (e.g., RAM, datastore 120), communicate with other computing devices or applications (e.g., via network 110 or internal buses), receive user input, provide output to a user, etc.

Administrator device 140 may correspond to one or more administrator users associated with provider server 130 and service 132. For example, administrator device 140 may be used by an administrator user to access a management portal (e.g., in a web browser) of provider server 130 to configure service 132. In an embodiment, administrator device 140 and provider server 130 may be associated with the same organization, as depicted by organization 170 in FIG. 1. For example, organization 170 may be a public or private enterprise, a non-profit organization, a government agency, or any other organization providing or managing a network service. In this example, administrator device 140 may be a device of an information technology (IT) professional, an infrastructure engineer, or other user employed by or otherwise associated with organization 170. In an embodiment, multiple administrator devices 140 (not depicted) may be used to administer and configure service 132 on provider server 130.

Client device 150 may correspond to one or more client users associated with provider server 130 and service 132. For example, client device 150 may be used by a client user to interact with service 132. Client device 150 may correspond to a client in a host-client service or a peer in a peer-to-peer service. Client device 150 may include service client 152 for communicating with service 132 and compliance agent 154 for ensuring that client device 150 is compliant with one or more compliance profiles required for accessing service 132. Service client 152 may be hardware (e.g., circuitry, dedicated logic), software (e.g., an application, library, or framework), or a combination thereof in various embodiments. Example service clients include OpenSSH and PuTTY clients for SSH services, and web browsers for various web applications and websites. In an embodiment, client device 150 may be associated with organization 170 (not depicted). For example, client device may be a phone or laptop provided by an employer (or provisioned with a bring-your-own-device policy) to access a private enterprise network or other service (e.g., service 132). The client user may be an employee or other associate in this example. In an embodiment, client device 150 may be external to organization 170. For example, client device 150 may be a personal device of a customer of organization 170, and client device 150 may access a public web application of organization 170 (service 132) over the Internet.

Access control server 160 may provide access control and client compliance verification in relation to service 132. For example, access control server 160 may provide one or more compliance profiles (e.g., compliance profiles 166) to client device 150 and receive compliance information from client device 150. Access control server 160 may also receive compliance profiles or requirements from provider server 130 or administrator device 140 and may issue access certificates for service 132 if client device 150 is compliant with the requirements. Access control server 160 may include secure enclave 162 to store signing key 164, compliance profiles 166 or other data. Secure enclave may also perform secure operations such as signing access certificates with signing key 164, communicating with client devices for integrity protocols, etc. Secure enclaves and multi-purpose servers having secure enclaves are further discussed with respect to FIG. 6. In an embodiment, access control server 160 may be associated with a second organization 172, which may be different than organization 170. For example, organization 172 may be a software-as-a-service (SaaS) provider and may provide access control and compliance verification services to organization 170 (e.g., a customer). In an embodiment, organizations 170 and 172 may be the same organization. For example, an enterprise may implement access control and compliance verification for network services it provides to employees, customers, etc.

Administrator device 140 may configure access control server 160 to provide compliance-based client access control for service 132. For example, administrator device 140 may provide one or more compliance profiles 166 to access control server 160 and may also provide a mapping of compliance profiles 166 to one or more services or one or more capabilities or levels of access within a service. Administrator device 140 may also obtain a public key or certificate of access control server 160 (e.g., corresponding to signing key 164) and provide it to provider server 130 for validation of access certificates signed by access control server 160. Administrator device 140 may perform other configurations to facilitate communication between access control server 160 and provider server 130 for access control purposes. In an embodiment, where organization 170 is a different organization than organization 172, administrator device 140 may provision access control services from organization 172 for services or clients within organization 170. The public key or certificate of access control server 160 may be signed by a certificate authority associated with organization 172.

Compliance agent 154 may include a hardware component, a software component, or any combination thereof. Hardware and software of compliance agent 154 may provide various protections to prevent users from tampering with the compliance checking process. Examples of protections include integrity indicators to be sent with compliance indicators to access control server 160, integrity protocols and communication sequences with access control server 160 or other servers, and similar. Various examples are further described with respect to FIG. 4.

In an embodiment, compliance agent 154 may include an external hardware component that observes physical characteristics of client device 150, provides compliance test signals to client device 150, isolates compliance-related data (e.g., keys, software) from client device 150, or performs other compliance-related activities. Examples of external hardware components include a USB token, a trusted platform module (TPM), or a specialized PCIe card. Hardware components may be developed or procured by organization 170 and may be distributed to client devices through organization 170's hardware provisioning process. For example, hardware components may be installed in client devices before distributing client devices to users, or hardware components may be delivered to users separately and subsequently installed (e.g., plugged in) by users. Hardware components may also be developed or procured by organization 172 and may be distributed to client devices through various channels. In this scenario, administrator device 140 may provide additional compatibility configurations for hardware components distributed by organization 172.

In an embodiment, compliance agent 154 may include a compliance software that observes activity of software and hardware systems of client device 150 (e.g., available hardware, OS and application activity, filesystem contents), provides compliance test signals to client device 150 (e.g., malware signatures), executes instructions to bring client device 150 into compliance (e.g., changes configurations automatically), or performs other compliance-related activities. Examples of compliance software include compiled binaries, scripts, libraries, security components, etc. Compliance software may be developed or procured by organization 170 and may be distributed to client devices through organization 170's software distribution process. For example, organization 170 may store compliance software for compliance agent 154 in a software update database (e.g., in datastore 120) and may cause compliance software to be distributed to client devices during a software update (e.g., a routine update or a security update). Organization 170 may also provide compliance agent 154 to organization 172/access control server 160 which may store compliance agent 154 (e.g., in datastore 120) and may distribute it to client devices (e.g., as part of providing compliance profiles, or in a separate communication). Software components may be developed or procured by organization 172 and may be distributed to clients through access control server 160 or other channels. For example, organization 172 may provide a uniform compliance agent for a plurality of organizations using organization 172's access control services. Compliance agents are further described with respect to FIGS. 2 and 3.

Figure 2:
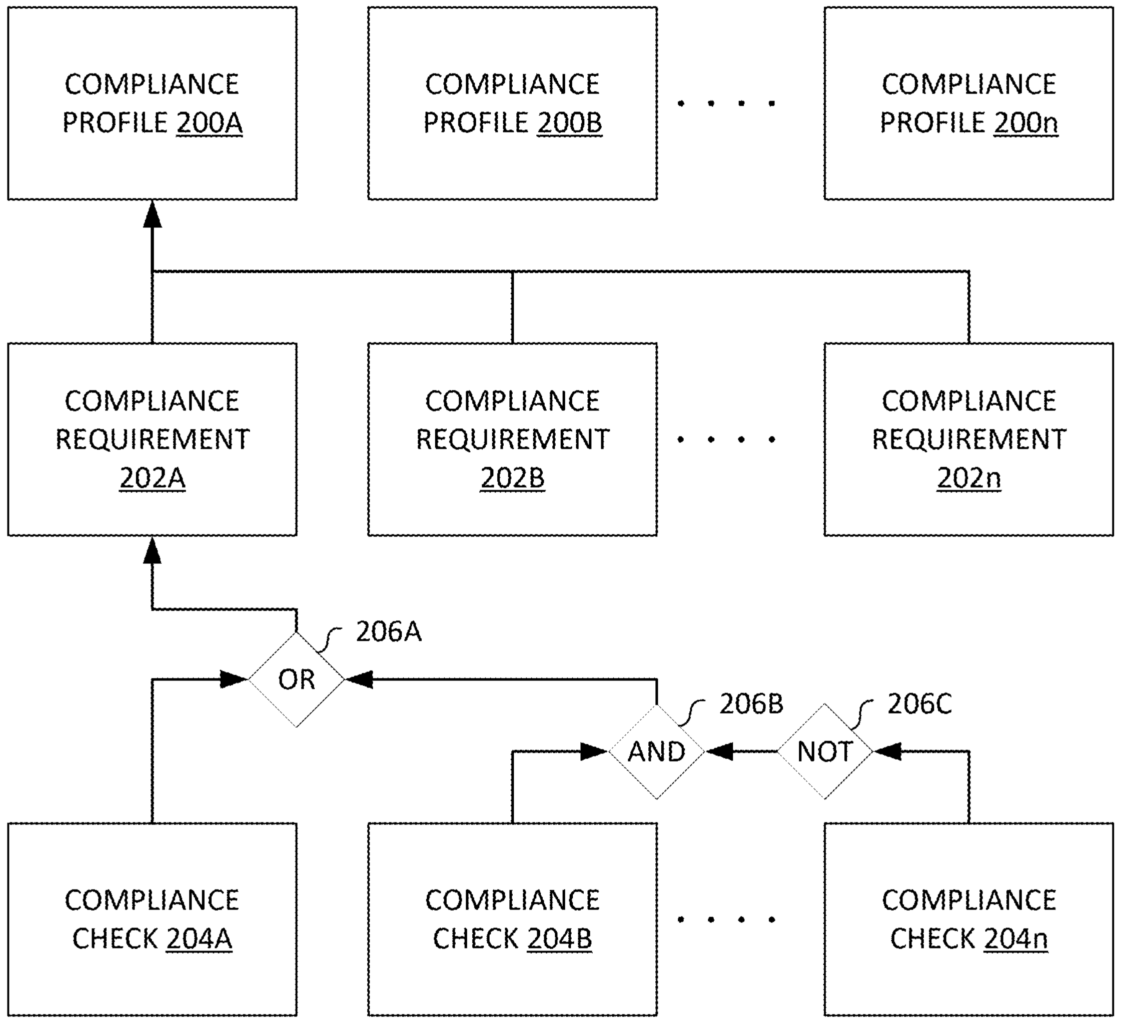
FIG. 2 illustrates example compliance profiles, in accordance with an embodiment.

FIG. 2 illustrates example compliance profiles 200A-n, in accordance with an embodiment. Compliance profiles 200A-n may correspond to compliance profiles 166 of FIG. 1 in an embodiment. As described with respect to FIGS. 1 and 4, a compliance profile may be associated with access to a service or to a subset of capabilities within a service. Compliance profiles may be provided by services, access control servers, administrators of services and access control servers, or other components. Compliance profiles may be provided to access control servers, service clients, or other components.

A compliance profile may include one or more compliance requirements. For example, compliance profile 200A corresponds to compliance requirements 202A-n. Profiles 200B-n may include similar or different compliance requirements analogous to compliance requirements 202A-n (not depicted). A compliance requirement may correspond to a necessary state or characteristic of a client device that connects to the service. For example, a compliance requirement may be associated with a hardware characteristic (e.g., a specific hardware component is present or absent), a software or firmware characteristic (e.g., an operating system or application is present or absent or is running a specific version), a configuration characteristic (e.g., a firewall or anti-virus software is properly configured), an identity characteristic (e.g., a client device serial number or an identity of a user of the client device is a permitted serial number/identity), or any other characteristic. Compliance requirements may be security-related, such as ensuring software is up to date and appropriate security software is installed on the client device, or ensuring that a client device or user thereof is properly identified. Compliance requirements may have other non-security purposes, such as ensuring that a customer's device has a paid access token installed, ensuring that the client device is not recording the screen or audio output before connecting to the service (e.g., for privacy or copyright purposes), or ensuring that sufficient local resources (e.g., memory, specific applications) are available to interact with the service.

A compliance requirement may include one or more compliance checks. For example, compliance requirement 202A corresponds to compliance checks 204A-n. Compliance requirements 202A-n may include similar or different compliance checks analogous to compliance checks 204A-n (not depicted). A compliance check may correspond to an action or observation that indicates a compliance requirement (or component thereof) is satisfied. Compliance checks may be combined with various operations to determine whether the compliance requirement is satisfied. For example, operations 206A-C combine compliance checks (and inverses thereof, e.g., check 204*n*) with logical conjunctions (e.g., AND 206B) and disjunctions (e.g., OR 206A) to determine if requirement 202A is satisfied. Other types of operations may be used. As depicted in FIG. 2, compliance checks may output a Boolean condition (e.g., true or false), and thus Boolean operations such as operations 206A-C may be appropriate. In another example (not depicted), compliance checks may output continuous values, scores, classifications, etc., which may be combined with operations such as addition and multiplication. The result may be compared to a threshold value to determine whether the compliance requirement is satisfied. Combinations of the above examples and other types of operations may be used in various embodiments.

A compliance check may be provided by hardware components, software/firmware components, or other components on the client device, the provider server, or the access control server. For example, a software component may be configured to observe system-wide settings or to observe the presence or absence of specific files in the filesystem (e.g., indicative of whether a particular software application is installed) in order to determine whether a compliance check passes. In another example, a software component may be configured to execute instructions or a hardware component may be configured to produce a signal to test whether a characteristic of the system passes the compliance check. A single compliance check may be associated with multiple components, such as versions corresponding to different operating systems. For example, one software component may perform a compliance check for the Windows operating system, while another software component may perform the same check for the Linux operating system. In an embodiment, compliance agent 154 of FIG. 1 includes one or more subparts (e.g., hardware and/or software) corresponding to one or more compliance checks. In an embodiment, one or more subparts corresponding to one or more compliance checks are provided to compliance agent 154 by servers 130 or 160 or by administrator device 140 (e.g., as plug-in or add-in components). In another example of a compliance check, a software component may determine an identity of the client device or user thereof (e.g., by receiving a username and password) and may make a local determination of whether the identity is permissible or may forward the identity to an access control server.

Compliance profiles, compliance requirements, and compliance checks may be cumulative or relative in various embodiments. For example, a plurality of compliance profiles may correspond to multiple compliance levels, with each higher-level compliance profile adding more requirements to a lower-level compliance profile (e.g., by referencing a lower-level profile and adding additional requirements, or by requiring multiple profiles be satisfied for a particular level). Referring to FIG. 2, profile 200A may correspond to a first level of compliance profile, profiles 200A-B may correspond to a second level, and profiles 200A-n may correspond to an $n^{th}$ level of compliance profile. In a similar example for compliance requirements, a first compliance requirement may require an antivirus installation configured for a lower detection level. A second compliance requirement, by reference to the first, may require the same antivirus installation but configured for a higher detection level. Similar patterns may apply to compliance checks (e.g., one check component may call another internally).

In an illustrative example of the aspects described with respect to FIG. 2, a service may be associated with a security compliance profile. The security compliance profile may have five compliance requirements: a firewall is to be configured for specific rules, the operating system is to be up to date, an anti-virus program is to be installed and running, the system is to be configured for a single user, and a user of the system must be a permitted user. The firewall requirement may be associated with multiple compliance checks, one for each required firewall rule, and the check results may be AND'ed together to determine whether the requirement is satisfied. The OS requirement may be associated with a compliance check component that queries the operating system version and compares to a minimum version number (e.g., a threshold). The anti-virus requirement may be associated with a plurality of compliance checks each corresponding to a different anti-virus vendor, and the results of the checks may be OR'ed together to ensure that at least one anti-virus program is installed and running. The anti-virus checks may further execute code to test the anti-virus program's responses to specific malware patterns. For the single user requirement, a plurality of checks corresponding to different operating systems may be OR'ed together to ensure that a maximum of one user is configured for the current operating system. For the permitted user requirement, an identity of the user may be obtained (e.g., username, password, 2FA, security key, etc.) and compared against a list of permitted users locally or at an access control server.

Compliance profiles may be structured in manners other than those described with respect to FIG. 2 in various embodiments. For example, the mapping of compliance checks to compliance requirements or compliance requirements to compliance profiles may be one-to-one, such that one of the layers depicted in FIG. 2 is absent. In another example, compliance profiles may include other compliance information rather than or in addition to compliance requirements and compliance checks.

Figure 3:
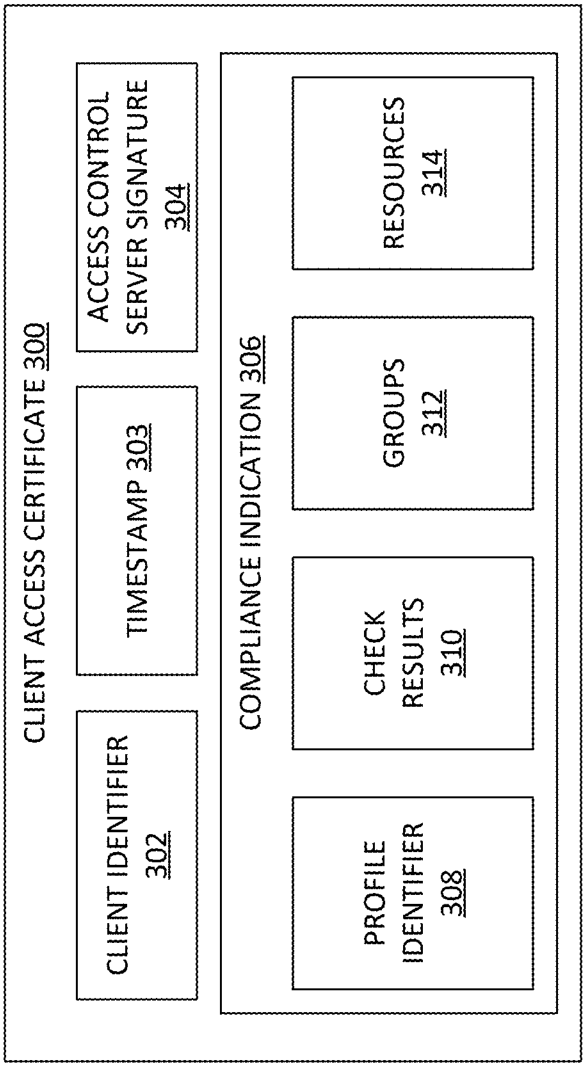
FIG. 3 is a block diagram of an example client access certificate, in accordance with an embodiment.

FIG. 3 is a block diagram of an example client access certificate 300 (also referred to as "access certificate" herein), in accordance with an embodiment. Access certificate 300 may be provided by an access control server (e.g., access control server 160) to a service client (e.g., client device 150 or a service client thereon), which may use access certificate 300 to connect to a network service of a provider server (e.g., service 132 of provider server 130).

Access certificate 300 includes client identifier 302, which may be a cryptographic key, a hash, a unique name, or other data identifying the client device or service client. For example, identifier 302 may be a public key of an asymmetric key pair used for connecting to a network service. In another example, identifier 302 may be a universally unique identifier (UUID) or other unique identifier generated by the service client or assigned by another entity/device. In another example, identifier 302 may be another cryptographic certificate or an associated public key included in access certificate 300 to establish a chain of trusted certificates. Identifier 302 may include combinations of these and other identifiers in various embodiments.

Access certificate 300 includes timestamp 303 which may indicate a time that access certificate 300 was created (or signed, sent, etc.) or a time that access certificate 300 expires (e.g., may no longer be used for access to a network service). Both types of timestamps may be provided, in some embodiments. Timestamps may be absolute or relative. For example, an absolute timestamp may be provided for a creation time, and a relative timestamp may indicate the lifetime of access certificate 300. The expiration time can be determined by combining the two timestamps.

Access certificate 300 includes access control server signature 304, which may be a signature (e.g., generated using RSA, ECDSA, and/or other cryptographic schemes) of the access control server that enables the provider server to validate the authenticity of access certificate 300. Signature 304 may be associated with additional certificates and certificate authorities (CA) establishing a chain of trust under a trusted root CA. At least one CA in the chain (which may be the access control server) may be trusted by the provider server.

Access certificate 300 includes compliance indication 306 indicating that the client device/service client complies with one or more compliance profiles for various purposes. Various indications may be provided in various embodiments. For example, compliance indication 306 may include names, identifiers, or specifications of compliance profiles for which the service client is compliant (e.g., profile identifier 308). In another example, compliance indication 306 may include specifications, compliance check results, or other characteristics of the service client corresponding to the requirements of the compliance profile(s) (e.g., check results 310). In another example, compliance indication 306 may include groups or permissions that are available to the service client based on the service client's compliance level, such as administrator or root groups/permissions (e.g., groups 312). In yet another example, compliance indication 306 may identify services and other resources that the service client is permitted to access (e.g., as determined by the access control server) based on the service client's compliance level (e.g., resources 314). Compliance indication 306 may include combination of these and other compliance indications in various embodiments.

In various embodiments, fields of access certificate 300 depicted in FIG. 3 may be absent, or access certificate 300 may include additional fields and information not depicted in FIG. 3. For example, additional identifiers, timestamps, signatures, or indications may be included. Compliance indication 306 may indicate other resources available to the client, such as additional services or additional features within a service. Thus, access certificate 300 may be multipurpose by providing a client device access to multiple services, such as a VPN service to connect to a private network and an SSH service available on that private network. In an embodiment, access certificate 300 may be provided in a format or have fields expected by authentication modules or agents on the client side or the server side. For example, access certificate 300 may conform to an authentication data format of a service protocol (e.g., VPN, SSH) or an authentication protocol (e.g., ssh-agent, PAM).

Compliance-Based Client Access Control

Figure 4:
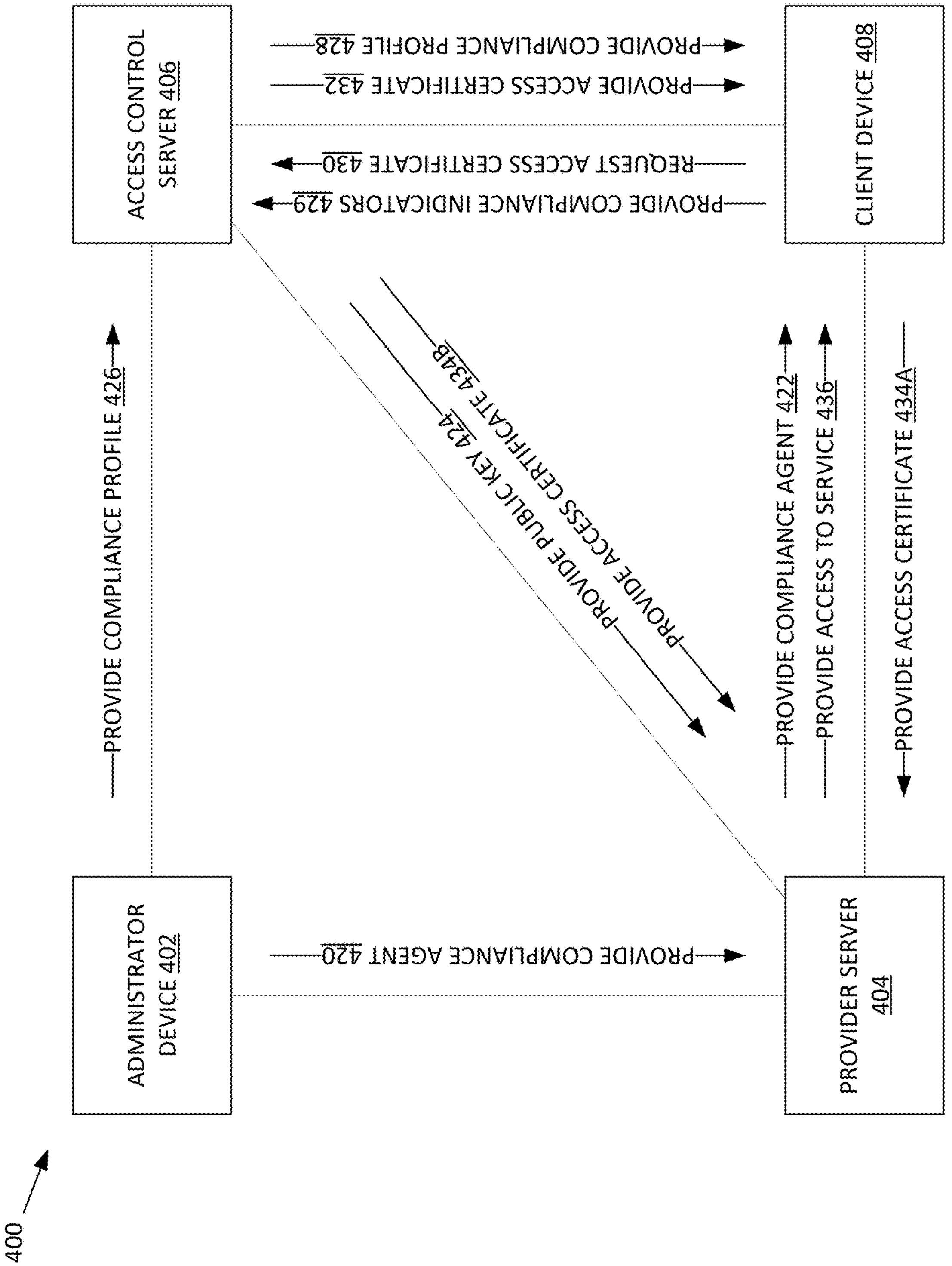
FIG. 4 is a communication diagram of an example interaction between devices for providing compliance-based client access control for network services, in accordance with an embodiment.

FIG. 4 is a communication diagram of an example interaction 400 between administrator device 402, provider server 404, access control server 406, and client device 408 for providing compliance-based client access control for network services, in accordance with an embodiment. In an embodiment, administrator device 402, provider server 404, access control server 406, and client device 408 correspond to administrator device 140, provider server 130, access control server 160, and client device 150 of FIG. 1, respectively. In some embodiments, communications depicted in FIG. 4 could be performed in a different order or by different components than depicted. Various embodiments may include additional communications not depicted in FIG. 4 or a subset of communications depicted in FIG. 4. The communications depicted in FIG. 4 may correspond to different communication sessions or different timing intervals. For example, some communications may proceed in immediate succession or may be part of a single communication session, while other communications may be spread out over time or may be part of different communication sessions.

At communication 420, administrator device 402 provides, establishes, or initializes a compliance agent on provider server 404. At communication 422, provider server 404 provides the compliance agent or any portion of compliance agent to client device 408. The compliance agent may be compliance agent 154 of FIG. 1. As previously described, the compliance agent may be or include a hardware component and/or a software component (e.g., a compiled binary or a script). In some embodiments, administrator device 402 may provide the compliance software to provider server 404 as part of a software distribution system, and provider server 404 may in turn distribute the compliance software to client devices within the administrator's organization. In some embodiments, the hardware components of the compliance agents may have been previously installed on the client devices. For example, an IT department of an enterprise may deploy the compliance agent to organization-owned devices or personal devices (e.g., with a bring-your-own-device policy) using the same software installation and update process as is used for other applications. Provider server 404 as depicted in FIG. 4 may also represent two separate servers—one for providing the network service and one for deploying the compliance agent (and other software). In an embodiment, the compliance agent may alternatively be obtained by the client device from the Internet or other public network (e.g., from a public website of the administrator's organization or from an open-source repository). In an embodiment, the compliance agent (or any portion thereof) is alternatively provided to client device 408 by access control server 406, which may be associated with a second organization. In one example, access control server 406 may serve as a software distribution server for a compliance software provided by administrator device 402 or the administrator's organization. In another example, access control server 406 may provide a common compliance software associated with the second organization, which may be used by the administrator's organization and other organizations using access control server for providing compliance-based client access control. Hardware compliance components may be provided in other ways, such as through an organization's usual hardware provisioning and distribution process.

At communication 424, access control server 406 provides a public key to provider server 404. The public key may correspond to a private key (e.g., signing key 164) of an asymmetrical cryptosystem (e.g., RSA, ECDSA). Access control server 406 may use the private key for generating digital signatures for access certificates, and provider server 404 may use the public key for verifying access control server 406's signature. Access control server 406's public key may be signed by a mutually trusted certificate authority, or provider server 404 may trust the public key implicitly (e.g., when both provider server 404 and access control server 406 are part of the same organization). Provider server 404 may thus be able to identify a chain of trust for access certificates signed by access control server 406. In an embodiment, access control server 406 may provide its public key to provider server 404 via an intermediary, such as by posting the public key on the Internet or by providing the public key to a repository of certificates/keys later accessed by provider server 404. The public key may also be provided to provider server 404 by administrator device 402. In an embodiment, the public key (or a certificate comprising the public key) may have limited lifetime (e.g., minutes, days, years, depending on the application). Thus, communication 424 may be performed again to deliver a new public key (or certificate) prior to expiration of the previous public key.

At communication 426, administrator device 402 provides one or more compliance profiles to access control server 406. At communication 428, access control server 406 provides the compliance profile(s) to client device 408. The compliance profile(s) may correspond to compliance profiles 200A-n of FIG. 2. As previously described, the compliance profile(s) may include compliance requirements that must be satisfied by client devices before accessing a service or services provided by provider server 404. Compliance profiles may also be associated with different levels of access or capabilities for a single service. A basic compliance profile may correspond to user-level access to a service, while a comprehensive compliance profile may correspond to root- or admin-level access to the service. Administrator device 402 and access control server 406 may provide specific compliance profiles in response to a request by access control server 406 or client device 408 respectively, or compliance profiles may be provided in bulk or without prompting. In an embodiment, the compliance profiles may be provided to client device 408 as part of the compliance software (e.g., as data included in the software distribution), which may be distributed by servers 404-406 as previously described. In such an embodiment, communication 428 may instead be an indication of a particular compliance profile to be accessed by the compliance agent to perform compliance checks. In an embodiment, communication 428 (or a similar communication from access control server 406 to client device 408) may include one or more integrity indicators as described below.

Subsequent to receiving a compliance profile (or indication thereof) from access control server 406, the compliance agent on client device 408 may identify the constituent compliance requirements and corresponding compliance checks and may proceed to perform the compliance checks on client device 408 as described with respect to FIG. 2. The compliance agent may generate one or more compliance indicators, which may correspond to results of individual compliance checks or individual compliance requirements. The indicators may be Boolean (e.g., pass/fail) or may be other data types. For example, the compliance indicator for an OS-version check may be a string or integer corresponding to the OS version number. In another example, the compliance indicator may include cryptographic evidence of compliance generated by a trusted platform module (TPM) or other cryptographic component of client device 408. At communication 429, client device 408 provides the compliance indicator(s) to access control server 406.

In an embodiment, the compliance agent or other software component of client device 408 may receive one or more integrity indicators from administrator device 402, provider server 404, access control server 406, or other source, which may be used to verify the compliance agent or other compliance components. Thus, client device 408 may ensure that a provider of compliance components or a user of client device 408 has not modified or otherwise interfered with the function of the compliance agent/components. The integrity indicator(s) may be a control hash corresponding to a hashed value of a compliance component or associated binary. Various other types of integrity indicators may be provided. The integrity indicator(s) may be received in communication 422, communication 428, or similar.

In an embodiment, the compliance agent may further generate one or more integrity indicators, which may be used by access control server 406 to verify that client device 408 or the associated user did not interfere with or manipulate the compliance check process. For example, the compliance agent may calculate a hash of itself (e.g., of the compiled binary, script, etc.), which may be used by access control server 406 to verify that the agent has not been changed. In other examples, compliance agent may use specialized hardware (e.g., an external security key, a secure enclave as described with respect to FIG. 6), additional communication sequences with access control server 406 or other components, or various other protocols to generate an integrity indicator. The integrity indicators may be provided to access control server 406 with the compliance indicator(s) in communication 429, or the integrity indicators may be provided in a separate communication.

Other types of integrity protocols involving various integrity indicators generated and/or verified on a subset of devices 402-408 may be used in various embodiments.

At communication 430, client device 408 requests an access certificate from access control server 406 to access the service provided by provider server 404. In an embodiment, the request may include the one or more of the compliance indicators generated by the compliance agent (e.g., communication 429 may be combined with communication 430). The request may also include the one or more integrity indicators (e.g., in an embodiment where the integrity indicators are to be verified by access control server 406). Other data may be included in the request in various embodiments, such as an identifier of the client device (e.g., a public key to be used to connect to a VPN or other service), an identifier of the service to be connected to, timestamps, etc.

Subsequent to receiving an access certificate request and compliance indicators from client device 408 (e.g., in one request or in separate communications), access control server 406 may evaluate the compliance indicators to determine if the compliance requirements of the compliance profile are satisfied. Evaluating the compliance indicators may include observing a Boolean value (e.g., pass/fail), comparing a compliance indicator to a threshold value, double-checking the calculations performed by the compliance agent, or similar. In an embodiment, access control server 406 may also validate an included integrity indicator by, e.g., comparing a received hash to a known control hash (which may be calculated locally or may be received from, e.g., administrator device 402), checking a digital signature, performing a series of communications with client device 408 in a validation protocol, or similar. These integrity validations may be performed by client device 408 in other embodiments.

If access control server 406 determines that the compliance requirements of the compliance profile are satisfied, determines that the integrity indicator is valid, or makes other necessary determinations related to the access certificate request, access control server 406 may proceed to generate an access certificate for the service provided by provider server 404. The access certificate may be access certificate 300 of FIG. 3. The access certificate may include an indication that client device 408 complies with the compliance requirements of the compliance profile. The indication may be a Boolean value (complies/does not comply), an identifier of the compliance profile (e.g., a unique identifier), a listing of the compliance requirements and associated compliance indicators, etc. The access certificate may further include an identifier of the client device, a user of the client device, and/or a particular session instantiated for the user on the client device, such as a unique identifier or a public key to be used to access the service. The access certificate may further include a timestamp(s) indicating a generation time or expiration time of the access certificate. Other data relevant to access control and other purposes may also be included. The access certificate may include a digital signature of access control server 406, which may be generated using the private key associated with the public key provided in communication 424, such that the access certificate is verifiable by provider server 404. As previously discussed, the digital signature included in the access certificate may be associated with a certificate provided by a trusted certificate authority (or a chain of such certificates), which may enable provider server 404 to establish a chain of trust for the access certificate.

The generated access certificate may be a limited-duration access certificate based on the expiration time of the certificate. What is considered a limited-duration certificate may vary for different services and in different contexts. The lifetime of a limited-duration certificate may be determined by the frequency with which client devices' compliance needs to be checked. For example, a limited-duration certificate may expire within a few minutes for a high-security service with frequent checks (e.g., a remote login service), a few hours for a medium-security service with somewhat frequent checks (e.g., a VPN service), and a few days for a low-security or non-security-focused service with infrequent checks (e.g., a web application). In an embodiment, administrator device 402 provides an access certificate lifetime value to access control server 406 (e.g., as part of communication 426), which access control server 406 uses to generate an expiration time for the access certificate. In an embodiment, the expiration time is determined by the service using a timestamp in the access certificate indicating generation time.

At communication 432, access control server 406 provides the access certificate to client device 408. At communication 434A, client device 408 provides the access certificate to provider server 404 for accessing the service. In an embodiment, access control server 406 provides the access certificate directly to provider server 404 (e.g., communication 434B) or through another intermediary. Responsive to receiving the access certificate, provider server 404 may verify the digital signature in the access certificate using the public key provided in communication 424 as previously discussed. Provider server 404 may further verify that the compliance indication in the certificate corresponds to the compliance profile needed to access the service. Provider server 404 may further verify that the access certificate is active and not expired. Provider server 404 may perform other verifications as necessary in various embodiments and may then provide client device 408 access to the service at communication 436. Provider server 404 may periodically receive new access certificates demonstrating continued compliance before expiration of previous access certificates and may thus continue to allow access. If new access certificate(s) indicate increased or decreased compliance (e.g., compliance corresponding to lesser, greater, or different compliance profiles), provider server 404 may increase or restrict access to capabilities of the service as a result. If client device 408 falls out of compliance or does not provide a new access certificate before expiration of a previous certificate, provider server 404 may end access and close the connection with client device 408.

Figure 5A:
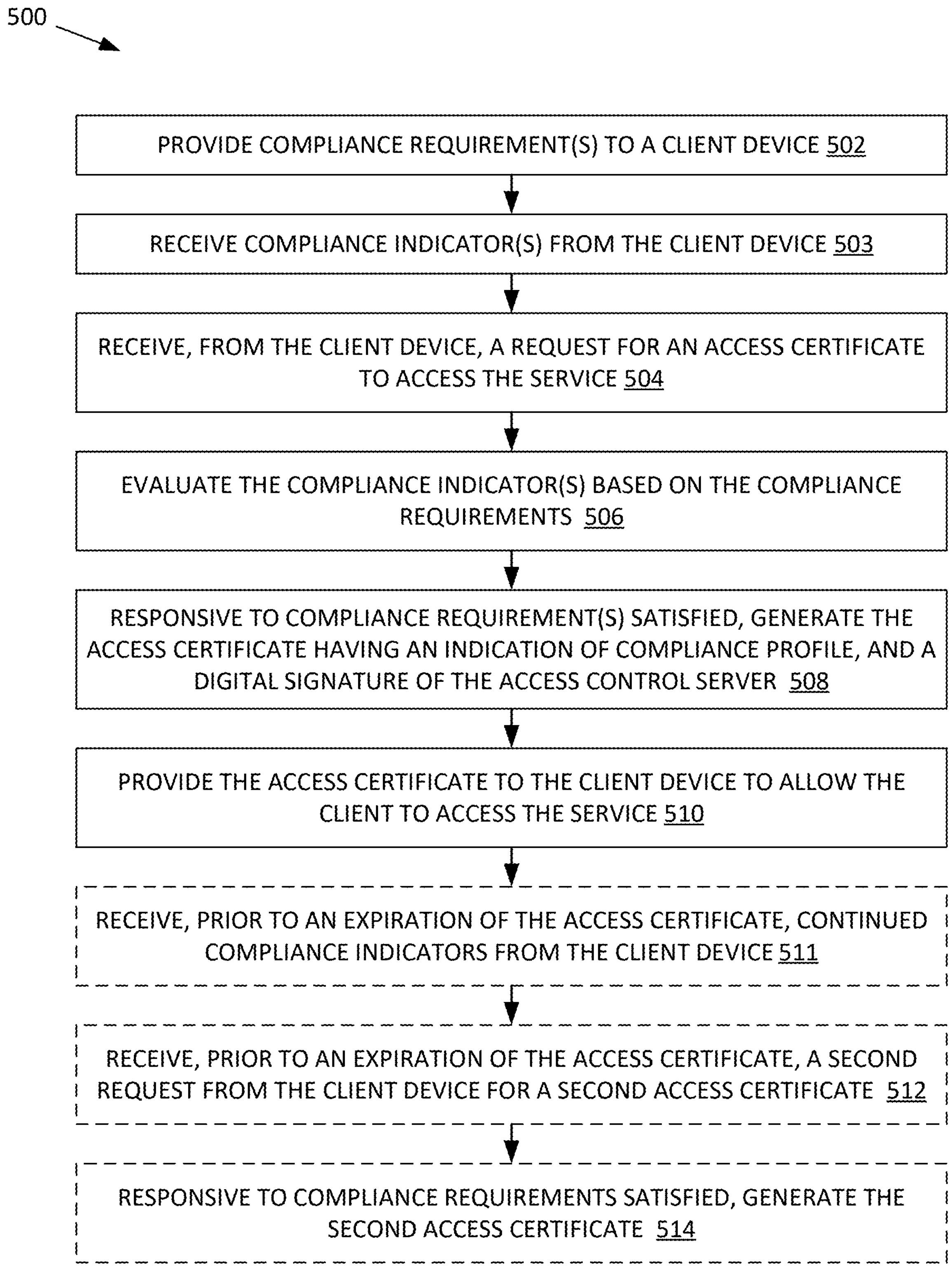
FIG. 5A is a flow diagram of an example method for providing compliance-based client access control for network services, performed by an access control server, in accordance with an embodiment.

FIG. 5A is a flow diagram of an example method 500 for providing compliance-based client access control for network services, performed by an access control server, in accordance with an embodiment. Method 500 may be performed by processing logic that may include hardware (e.g., circuitry, dedicated logic, etc.), computer-readable instructions such as software or firmware (e.g., run on a general-purpose computing system or a dedicated machine), or a combination thereof. For instance, an example system may include a memory and a processing device coupled to the memory device to perform operations comprising the blocks of method 500. Method 500 may also be associated with a set of instructions stored on a non-transitory computer-readable medium (e.g., magnetic or optical disk, etc.). The instructions, when executed by a processing device, may cause the processing device to perform operations comprising the blocks of method 500. In an embodiment, method 500 is performed by the system of FIG. 1 or components thereof (e.g., provider server 130, administrator device 140, client device 150, access control server 160). In an embodiment, method 500 is performed by computing system 700 of FIG. 7. In some embodiments, blocks depicted in FIG. 5A could be performed simultaneously or in a different order than depicted. Various embodiments may include additional blocks not depicted in FIG. 5A or a subset of blocks depicted in FIG. 5A. For example, blocks 512-514 may be absent in an embodiment, as indicated by dashed outlines.

At block 502, processing logic of an access control server provides, to a client device, one or more compliance requirements to be met by the client device prior to accessing a service. The access control server may be access control servers 160 or 406 of FIGS. 1 and 4. The client device may be client devices 150 or 408, or service client 152. For example, the client device may be a PC, a desktop computer, a laptop computer, a notebook computer, a mobile phone, a smartphone, a tablet computer, a digital assistant, a server, a wearable device, a gaming console, a virtual/augmented/mixed reality device, and/or the like. The service may be service 132. The one or more compliance requirements may be included in a compliance profile. The compliance profile may be one of compliance profiles 166 or 200A-n. The one or more compliance requirements may be a subset of compliance requirements 202A-n. Providing the compliance profile may correspond to communication 428. As described with respect to FIGS. 1-4, compliance profiles may be delivered by other components of the system (e.g., by a provider server of the service) and may be provided as part of a compliance checking agent (e.g., as data within a hardware or software component). In an embodiment, the one or more compliance requirements to be met by the client device prior to accessing the service includes at least one of: a firewall requirement, an operating system version requirement, an anti-virus installation requirement, or a maximum user count requirement (e.g., as described with respect to the illustrative example of FIG. 2).

In an embodiment, processing logic further provides, to the client device, one or more integrity indicators. The integrity indicator(s) may be or include a hash of a set of instructions. The set of instructions may be a compiled set of instructions, such as a binary, bytecode, or similar. The set of instructions may be provided to the client by the access control server or other source (e.g., an administrator server, a deployment server, etc.) to generate the one or more compliance indicators. For example, the set of instructions may be compliance agent 154 (e.g., a compiled set of instructions that, when executed, perform the functions of compliance agent 154) or a compliance component thereof. The compliance agent or other software component of the client may receive the integrity indicator(s) and may use them to verify compliance agent 154 or other compliance components. Thus, client may ensure that a provider of compliance components or a user of the client has not modified or otherwise interfered with the function of the compliance agent/components.

At block 503, the processing logic receives, from the client device, one or more compliance indicators associated with the one or more compliance requirements. The received compliance indicators may correspond to communication 429. In an embodiment, a compliance requirement of the one or more compliance requirements includes a first check and a second check. Individual compliance indicators of the one or more compliance indicators may include at least one of: a logical conjunction of a result of the first check and a result of the second check, or a logical disjunction of the result of the first check and the result of the second check. For example, compliance indicators may correspond to results of compliance checks 204A-n or combinations thereof (e.g., via operations 206A-C), and may include various data types, e.g., Boolean results (pass/fail), string, integer values to be compared to threshold values, etc.

At block 504, the processing logic receives, from the client device, a request for an access certificate to access certificate to access the service. The request for an access certificate may correspond to communication 430. In an embodiment, the request includes the one or more compliance indicators associated with the one or more compliance requirements. Thus blocks 503 and 504 may be combined in an embodiment. In an embodiment, the request may be received before the compliance indicators (e.g., block 504 may precede block 503).

In an embodiment, the processing logic further receives an integrity indicator. The integrity indicator may be or include a hash of a set of instructions. The set of instructions may be a compiled set of instructions, such as a binary, bytecode, or similar. The set of instructions may be provided to the client by the access control server or other source (e.g., an administrator server, a deployment server, etc.) to generate the one or more compliance indicators. For example, the set of instructions may be compliance agent 154 (e.g., a compiled set of instructions that, when executed, perform the functions of compliance agent 154). In an embodiment, the access control server is associated with a first organization (e.g., organization 172), the client and the service are each associated with a second organization (e.g., organization 170), and a control hash is provided to the access control server by the second organization for validating the request integrity indicator.

At block 506, processing logic evaluates the one or more compliance indicators based on the one or more compliance requirements. As described with respect to FIG. 4, evaluating the compliance indicators may include observing a Boolean value of a compliance indicator (e.g., pass/fail), comparing a compliance indicator to a threshold value specified by a corresponding compliance requirement, double-checking the calculations performed by the compliance agent, and/or the like.

At block 508, responsive to determining that each compliance requirement of the one or more compliance requirements is satisfied by a respective compliance indicator of the one or more compliance indicators, the processing logic generates the access certificate certifying accessibility of the service to the client device. The access certificate may include an indication that the client device, a user of the client device, or a user session instantiated on the client device complies with the one or more compliance requirements. The access certificate may further include a digital signature of the access control server that is verifiable by the service. The access certificate may be access certificate 300 of FIG. 3. As previously described, the indication may be a Boolean value (complies/does not comply), an identifier of the compliance profile (e.g., a unique identifier), a listing of the compliance requirements and associated compliance indicators, etc. Other information may be included in the access certificate as appropriate for a specific application. The digital signature may be generated using a private key of the access control server and may be verified using a public key available (e.g., communicated) to the service for verification. For example, the public key may be signed by a trusted certificate authority (e.g., a certificate authority of the access control server's organization).

In an embodiment, where the request for the access certificate further includes a request integrity indicator, e.g., as described with respect to block 504, the processing logic validates the request integrity indicator prior to generating the access certificate. If the request integrity indicator is or includes a hash, e.g., as described with respect to block 504, the processing logic may compare the hash of the set of instructions to the control hash stored at the access control server. The control hash may be provided by, e.g., the service, an administrator of the service, or a member of an organization associated with the service.

At block 510, the processing logic provides the access certificate to the client device (e.g., to allow the client to access the service). Providing the access certificate may correspond to communication 432. The client device may then provide the access certificate to the service to obtain access to the service. In an embodiment, the processing logic provides the access certificate to the service directly or through another intermediary (e.g., by publishing the certificate or storing it in a database).

In some embodiments, at block 511, the processing logic may receive, prior to an expiration time of the access certificate, one or more continued compliance indicators associated with the one or more compliance requirements. At block 512, the processing logic may further receive, prior to the expiration time of the access certificate, a second request from the client device for a second access certificate extending accessibility of the service to the client device. The one or more continued compliance indicators may be included in the second request or may be received separately in various embodiments. The expiration time may be determined by the access control server or the service, e.g., as previously described or in a similar fashion. At block 514, responsive to the continued compliance indicators satisfying the compliance requirements, the processing logic may generate the second access certificate. In an embodiment, the access certificate and the second access certificate may be limited-duration access certificates (e.g., having a lifetime corresponding to the compliance checking frequency of a specific application). In an embodiment, the continued compliance indicators may indicate a change in compliance profile. The processing logic may determine to increase, decrease, or end access to the service based on the new compliance profile.

In some embodiments, the processing logic may provide a second compliance profile to the client device. For example, the second compliance profile may be an updated version of the compliance profile provided at block 502. The second compliance profile may be provided in response to changing compliance requirements (e.g., as indicated by an administrator device). In some embodiments, the second compliance profile may be provided in response to the continued compliance indicators of block 511 or the second request of block 512, such as upon determination of the processing logic that the client is out of compliance with the second compliance profile or the compliance profile of block 502.

Figure 5B:
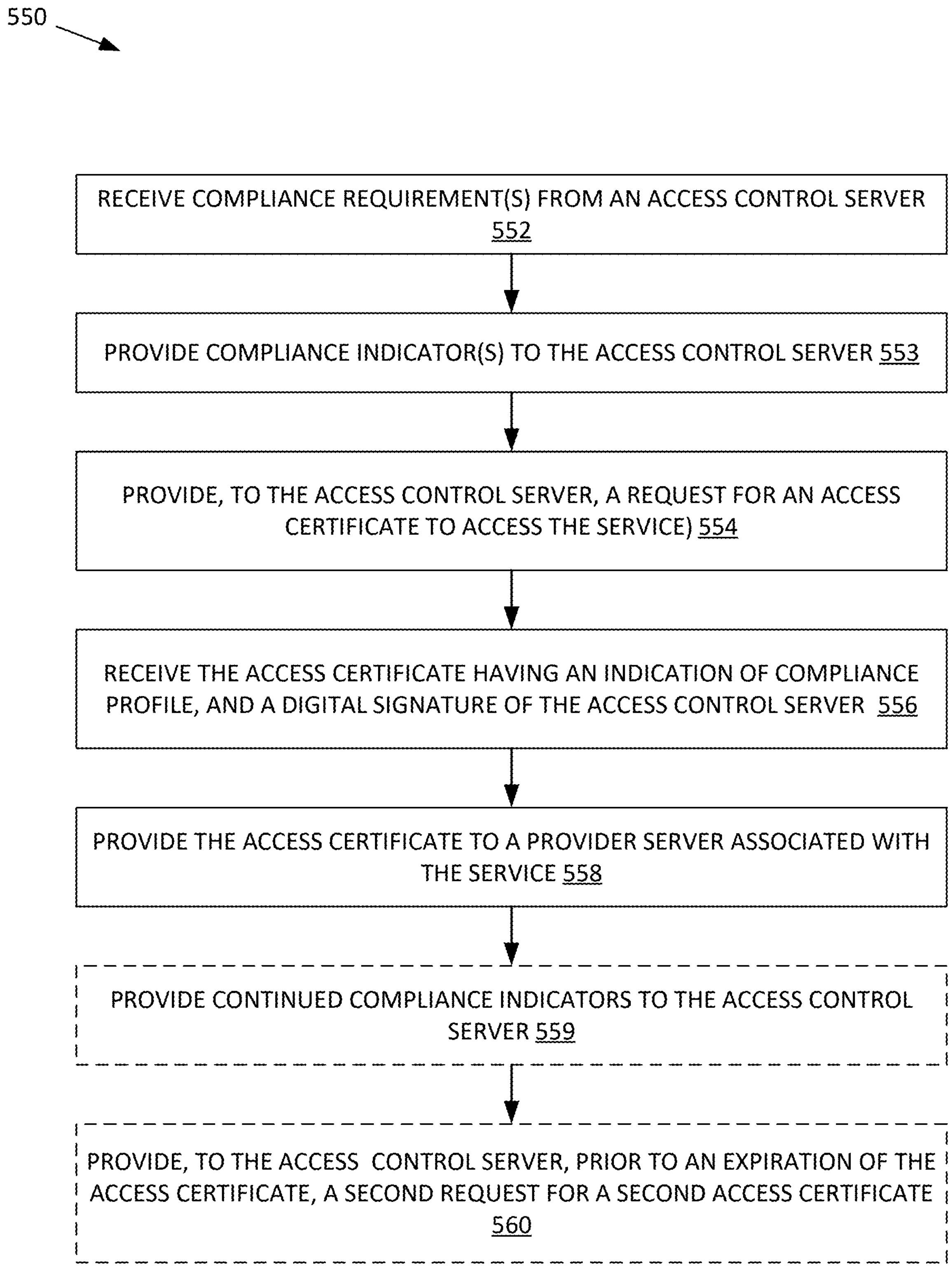
FIG. 5B is a flow diagram of an example method for obtaining compliance-based client access control for network services, performed by a client device, in accordance with an embodiment.

FIG. 5B is a flow diagram of an example method 550 for obtaining compliance-based client access control for network services, performed by a client device, in accordance with an embodiment. Method 550 may be performed by processing logic that may include hardware (e.g., circuitry, dedicated logic, etc.), computer-readable instructions such as software or firmware (e.g., run on a general-purpose computing system or a dedicated machine), or a combination thereof. For instance, an example system may include a memory and a processing device coupled to the memory device to perform operations comprising the blocks of method 550. Method 550 may also be associated with a set of instructions stored on a non-transitory computer-readable medium (e.g., magnetic or optical disk, etc.). The instructions, when executed by a processing device, may cause the processing device to perform operations comprising the blocks of method 550. In an embodiment, method 550 is performed by the system of FIG. 1 or components thereof (e.g., provider server 130, administrator device 140, client device 150, access control server 160). In an embodiment, method 550 is performed by computing system 700 of FIG. 7. In some embodiments, blocks depicted in FIG. 5B could be performed simultaneously or in a different order than depicted. Various embodiments may include additional blocks not depicted in FIG. 5B or a subset of blocks depicted in FIG. 5B. For example, block 560 may be absent in an embodiment, as indicated by dashed outlines.

At block 552, processing logic of a client device receives, from an access control server, one or more compliance requirements to be met by the client device prior to accessing a service. Block 552 may correspond to block 502 (e.g., from the client device perspective).

At block 553, the processing logic provides, to the access control server, one or more compliance indicators associated with the one or more compliance requirements. Block 553 may correspond to block 503.

At block 554, the processing logic provides, to the access control server, a request for an access certificate to access the service. Block 554 may correspond to block 504. In an embodiment, the one or more compliance indicators may be provided in the request for the access certificate (e.g., blocks 553 and 554 may be combined).

At block 556, the processing logic receives the access certificate certifying accessibility of the service to the client device. The access certificate may include an indication that the client device, a user of the client device, or a user session instantiated on the client device complies with the one or more compliance requirements. Block 556 may correspond to block 508.

At block 558, the processing logic provides the access certificate to a provider server associated with the service. Providing the access certificate may correspond to communication 434A.

In some embodiments, at block 559, the processing logic may provide, to the access control server, prior to an expiration time of the access certificate, one or more continued compliance indicators associated with the one or more compliance requirements. At block 560, the processing logic may further provide, to the access control server, prior to the expiration time of the access certificate, a second request for a second access certificate extending accessibility of the service to the client device. Block 559 may correspond to block 511. Block 560 may correspond to block 512. In an embodiment, the second request may include the one or more continued compliance indicators (e.g., blocks 559 and 560 may be combined).

Computer Systems

Figure 6:
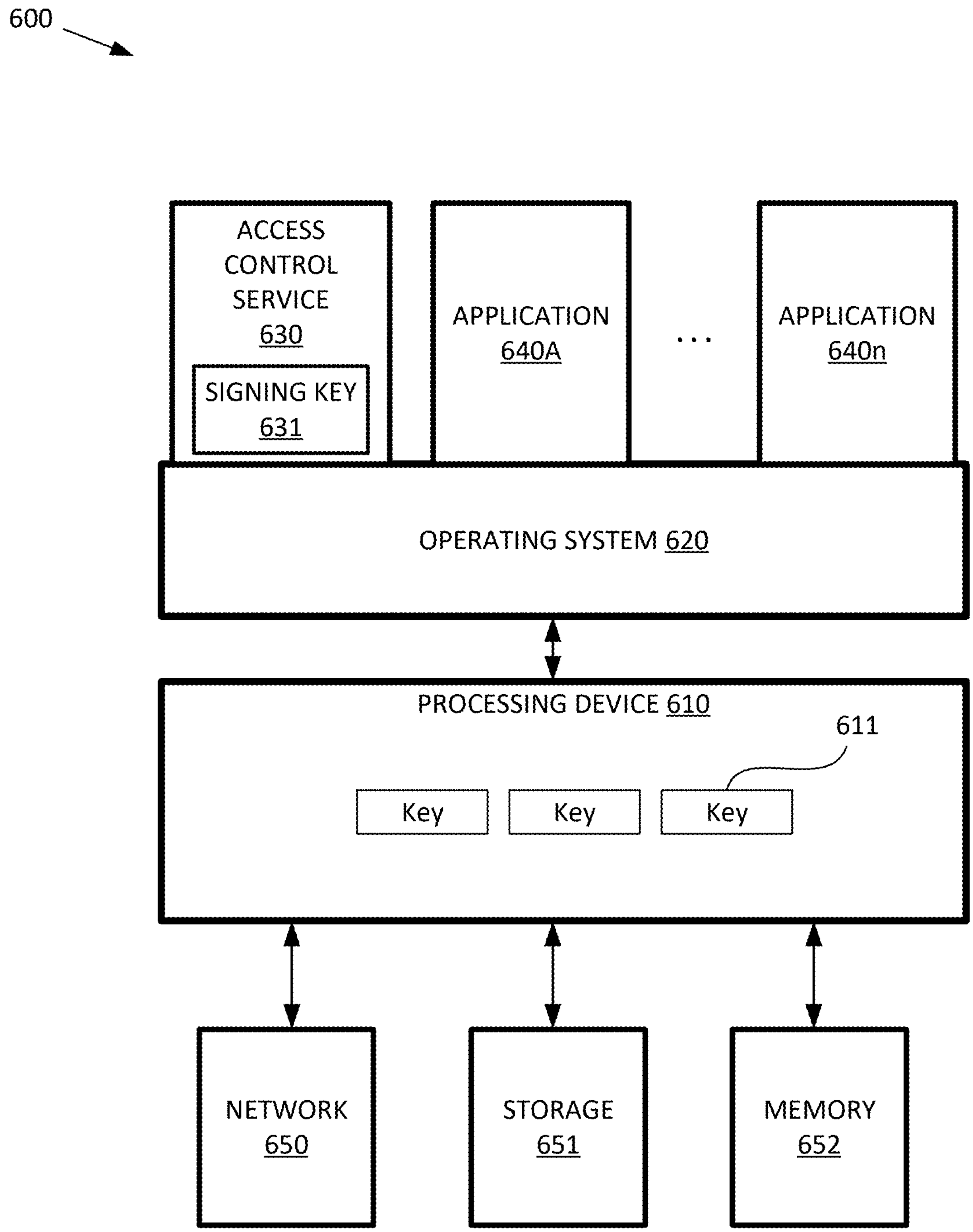
FIG. 6 illustrates an example network server having an access control service for providing compliance-based client access control for network services, in accordance with an embodiment.

FIG. 6 illustrates an example network server 600 with an access control service 630 for providing compliance-based client access control for network services, in accordance with an embodiment. Access control service 630 includes signing key 631, which may be used to digitally sign access certificates, and which may correspond to a public key used to verify access certificate signatures. In an embodiment, network server 600 running access control service 630 may correspond to access control server 160 of FIG. 1 or access control server 406 of FIG. 4. Signing key 631 may correspond to signing key 164 of FIG. 1.

As shown in FIG. 6, network server 600 may include processing device 610 that may execute operating system 620. Furthermore, processing device 610 may include one or more internal cryptographic keys 611 that may be used to encrypt and decrypt data stored in a portion of a memory that is assigned to a secure enclave of access control service 630. The access to the data of access control service 630 in the secure enclave (e.g., profiles, certificates, and keys stored at a storage resource) may be protected from one or more applications 640A-n and operating system 620. For example, the access to the data of the secure enclave corresponding to access control service 630 may be protected by the use of one of internal cryptographic keys 611 that are internal to processing device 610 so that the access to the data is based on a hardware access as opposed to a software access. Operating system 620 may be associated with a first privilege level and access control service 630 and applications 640A-n may be associated with a second privilege level where the first privilege level of the operating system is more privileged than the second privilege level of the various applications that are run on operating system 620 (e.g., the more privileged level allows access to more resources of the network server than the less privileged level). Thus, operating system 620 may be allowed access to resources of applications 640A-n. However, since access control service 630 is assigned to a secure enclave where access to the data of the secure enclave is based on the use of an internal cryptographic key 611 of processing device 610, operating system 620 may not be able to access the data of access control service 630 despite having a more privileged level of access than access control service 630. The master key that is used to decrypt data at the storage resource may be an internal cryptographic key 611.

In operation, a client device (e.g., client device 150 of FIG. 1) may request an access certificate from access control service 630. Since access control service 630 is assigned to a secure enclave, the signing key or compliance profiles of access control service 630 may be encrypted and protected by the use of an internal cryptographic key 611 (i.e., the master key) of processing device 610. Access control service 630 may subsequently use an instruction so that processing device 610 may use one of its internal cryptographic keys 611 to decrypt the data of the secure enclave of access control service 630 and to retrieve the data. Subsequently, a cryptographic operation such as signing an access control certificate may then be performed by processing device 610 and then the output of the cryptographic operation may be provided to access control service 630 which may return the output the client device as a generated access certificate. In some embodiments, internal cryptographic key 611 may be combined with additional information (e.g., the identification information of access control service 630) to generate the master key for access control service 630 that is used to decrypt and/or encrypt data associated with the secure enclave of access control service 630. Thus, since processing device 610 uses its internal cryptographic key 611 to decrypt data and to perform the cryptographic operation, the signing key 631 and other access control-related data may not be exposed external to processing device 610. Network services (and associated administrators and organizations) may thus be assured that access certificates issued by access control service 630 have not been tampered with at network server 600 and may therefore trust access certificates received from client devices.

FIG. 7 is a block diagram illustrating an example computer system 700, in accordance with implementations of the present disclosure. Computer system 700 may correspond to provider server 130, administrator device 140, client device 150, or access control server 160, as described with respect to FIG. 1. Computer system 700 may also correspond to network server 600, described with respect to FIG. 6. Computer system 700 may operate in the capacity of a server or an endpoint machine in endpoint-server network environment, or as a peer machine in a peer-to-peer (or distributed) network environment. The machine may be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Computer system 700 includes processing device 702 (e.g., one or more processors or cores), main memory 704 (e.g., read-only memory (ROM), flash memory, dynamic random access memory (DRAM) such as synchronous DRAM (SDRAM), double data rate (DDR SDRAM), or DRAM (RDRAM), etc.), static memory 706 (e.g., flash memory, static random access memory (SRAM), etc.), and data storage device 708, which communicate with each other via bus 710.

Processing device 702 represents one or more general-purpose processing devices such as a microprocessor, central processing unit, or the like. More particularly, processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute instructions 712 (e.g., for providing compliance-based client access control for network services) for performing the operations discussed herein.

Computer system 700 may further include network interface device 714. Computer system 700 also may include display device 716 (e.g., a liquid crystal display (LCD) or a cathode ray tube (CRT)), alphanumeric input device 718 (e.g., a keyboard, and alphanumeric keyboard, a motion sensing input device, touch screen), cursor control device 720 (e.g., a mouse), and signal generation device 722 (e.g., a speaker). In some embodiments, computer system 700 may not include display device 716, alphanumeric input device 718, and/or cursor control device 720 (e.g., in a headless configuration).

Data storage device 708 may include a non-transitory machine-readable storage medium 724 (also computer-readable storage medium) on which is stored one or more sets of instructions 712 (e.g., for providing compliance-based client access control for network services) embodying any one or more of the methodologies or functions described herein. Instructions 712 may also reside, completely or at least partially, within main memory 704 or within the processing device 702 during execution thereof by computer system 700, main memory 704 and processing device 702 also constituting machine-readable storage media. Instructions 712 may further be transmitted or received over network 726 via network interface device 714.

In one implementation, instructions 712 include instructions for providing compliance-based client access control for network services, as described herein. While computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing certain terms may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

As used in this application, the term "or" is intended to mean an inclusive "or" rather than an exclusive "or." That is, unless specified otherwise, or clear from context, "A or B" is intended to mean any of the natural inclusive permutations (e.g., A and B, A and not B, B and not A). In addition, the articles "a" and "an" as used in this application and the appended claims should generally be construed to mean "one or more" unless specified otherwise or clear from context to be directed to a singular form.

Furthermore, the terms "one implementation," "one embodiment," "an implementation," "an embodiment," or similar mean that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

What is claimed is:

1. A method comprising:

providing, by a processing device of an access control server, to a client device, one or more compliance requirements for accessing a service;

receiving, from the client device, one or more compliance indicators associated with the one or more compliance requirements, wherein:

a compliance requirement of the one or more compliance requirements comprises a first check and a second check, and a compliance indicator of the one or more compliance indicators associated with the compliance requirement comprises at least one of: a logical conjunction of a result of the first check and a result of the second check, or a logical disjunction of the result of the first check and the result of the second check;

receiving, from the client device, a request for an access certificate to access the service;

evaluating the one or more compliance indicators based on the one or more compliance requirements;

responsive to determining that each compliance requirement of the one or more compliance requirements is satisfied by a respective compliance indicator of the one or more compliance indicators, generating the access certificate certifying accessibility of the service to the client device, wherein the access certificate comprises:

an indication that at least one of the client device, a user of the client device, or a user session instantiated on the client device complies with the one or more compliance requirements, and a digital signature of the access control server that is verifiable by the service; and providing the access certificate to the client device.

2. The method of claim 1, further comprising:

providing, to the client device, an integrity indicator enabling the client device to validate a set of instructions associated with the one or more compliance indicators.

3. The method of claim 2, wherein the integrity indicator comprises a hash of the set of instructions, and wherein the set of instructions is provided to the client device by the access control server to generate the one or more compliance indicators.

4. The method of claim 3, wherein the access control server is associated with a first organization, wherein the client device and the service are each associated with a second organization, and wherein the hash is received by the access control server from a computing device associated with the second organization.

5. The method of claim 1, wherein the access certificate is a limited-duration access certificate, the method further comprising:

receiving, prior to an expiration time of the limited-duration access certificate, one or more continued compliance indicators associated with the one or more compliance requirements; and receiving, prior to the expiration time of the limited-duration access certificate, a second request from the client device for a second limited-duration access certificate extending accessibility of the service to the client device.

6. The method of claim 1, wherein the one or more compliance requirements to be met by the client device prior to accessing the service comprise at least one of: a firewall requirement, an operating system version requirement, an anti-virus installation requirement, a maximum user count requirement, a client device identity requirement, or a user identity requirement.

7. The method of claim 5, further comprising, responsive to the one or more continued compliance indicators indicating a change in compliance with the one or more compliance requirements, at least one of:

expanding access to the service;

reducing access to the service; or ending a session with the service.

8. A method comprising:

receiving, by a client device, from an access control server, one or more compliance requirements for accessing a service;

providing, to the access control server, one or more compliance indicators associated with the one or more compliance requirements, wherein:

a compliance requirement of the one or more compliance requirements comprises a first check and a second check, and a compliance indicator of the one or more compliance indicators associated with the compliance requirement comprises at least one of: a logical conjunction of a result of the first check and a result of the second check, or a logical disjunction of the result of the first check and the result of the second check;

providing, to the access control server, a request for an access certificate to access the service;

receiving, from the access control server, the access certificate certifying accessibility of the service to the client device, wherein the access certificate comprises:

an indication that at least one of the client device, a user of the client device, or a user session instantiated on the client device complies with the one or more compliance requirements, and a digital signature of the access control server that is verifiable by the service; and providing the access certificate to a provider server associated with the service.

9. The method of claim 8, wherein the one or more compliance indicators are generated using a set of instructions provided to the client device, the method further comprising:

receiving, from the access control server, a hash of the set of instructions; and validating the set of instructions using the hash.

10. The method of claim 9, wherein the access control server is associated with a first organization, wherein the client device and the service are each associated with a second organization, and wherein the hash originates with the second organization.

11. The method of claim 8, wherein the access certificate is a limited-duration access certificate, the method further comprising:

providing, to the access control server, prior to an expiration time of the limited-duration access certificate, one or more continued compliance indicators associated with the one or more compliance requirements; and providing, to the access control server, prior to the expiration time of the limited-duration access certificate, a second request for a second limited-duration access certificate extending accessibility of the service to the client device.

12. The method of claim 8, wherein the one or more compliance requirements to be met by the client device prior to accessing the service comprise at least one of: a firewall requirement, an operating system version requirement, an anti-virus installation requirement, a maximum user count requirement, a client device identity requirement, or a user identity requirement.

13. The method of claim 11, further comprising receiving, from the provider server, responsive to the one or more continued compliance indicators indicating a change in compliance with the one or more compliance requirements, at least one of:

expanded access to the service;

reduced access to the service; or an indication that a session with the service has ended.

14. A system comprising:

a memory device; and a processing device coupled to the memory device, the processing device to perform operations comprising:

providing, by an access control server, to a client device, one or more compliance requirements for accessing a service;

receiving, from the client device, one or more compliance indicators associated with the one or more compliance requirements, wherein:

a compliance requirement of the one or more compliance requirements comprises a first check and a second check, and a compliance indicator of the one or more compliance indicators associated with the compliance requirement comprises at least one of: a logical conjunction of a result of the first check and a result of the second check, or a logical disjunction of the result of the first check and the result of the second check;

receiving, from the client device, a request for an access certificate to access the service;

evaluating the one or more compliance indicators based on the one or more compliance requirements;

responsive to determining that each compliance requirement of the one or more compliance requirements is satisfied by a respective compliance indicator of the one or more compliance indicators, generating the access certificate certifying accessibility of the service to the client device, wherein the access certificate comprises:

an indication that at least one of the client device, a user of the client device, or a user session instantiated on the client device complies with the one or more compliance requirements, and a digital signature of the access control server that is verifiable by the service; and providing the access certificate to the client device.

15. The system of claim 14, the operations further comprising:

providing, to the client device, an integrity indicator enabling the client device to validate a set of instructions associated with the one or more compliance indicators.

16. The system of claim 15, wherein the integrity indicator comprises a hash of a set of instructions, and wherein the set of instructions is provided to the client device by the access control server to generate the one or more compliance indicators.

17. The system of claim 16, wherein the access control server is associated with a first organization, wherein the client device and the service are each associated with a second organization, and wherein the hash is received by the access control server from a computing device associated with the second organization.

18. The system of claim 14, wherein the access certificate is a limited-duration access certificate, the operations further comprising:

receiving, prior to an expiration time of the limited-duration access certificate, one or more continued compliance indicators associated with the one or more compliance requirements; and receiving, prior to the expiration time of the limited-duration access certificate, a second request from the client device for a second limited-duration access certificate extending accessibility of the service to the client device.

19. The system of claim 14, wherein the one or more compliance requirements to be met by the client device prior to accessing the service comprises at least one of: a firewall requirement, an operating system version requirement, an anti-virus installation requirement, a maximum user count requirement, a client device identity requirement, or a user identity requirement.

20. The system of claim 18, the operations further comprising, responsive to the one or more continued compliance indicators indicating a change in compliance with the one or more compliance requirements, at least one of:

expanding access to the service;

reducing access to the service; or ending a session with the service.

* * * * *